W. P. LEWIS.
HORSESHOE.
APPLICATION FILED SEPT. 24, 1913.
1,113,796.
Patented Oct. 13, 1914.
2 SHEETS—SHEET 1.
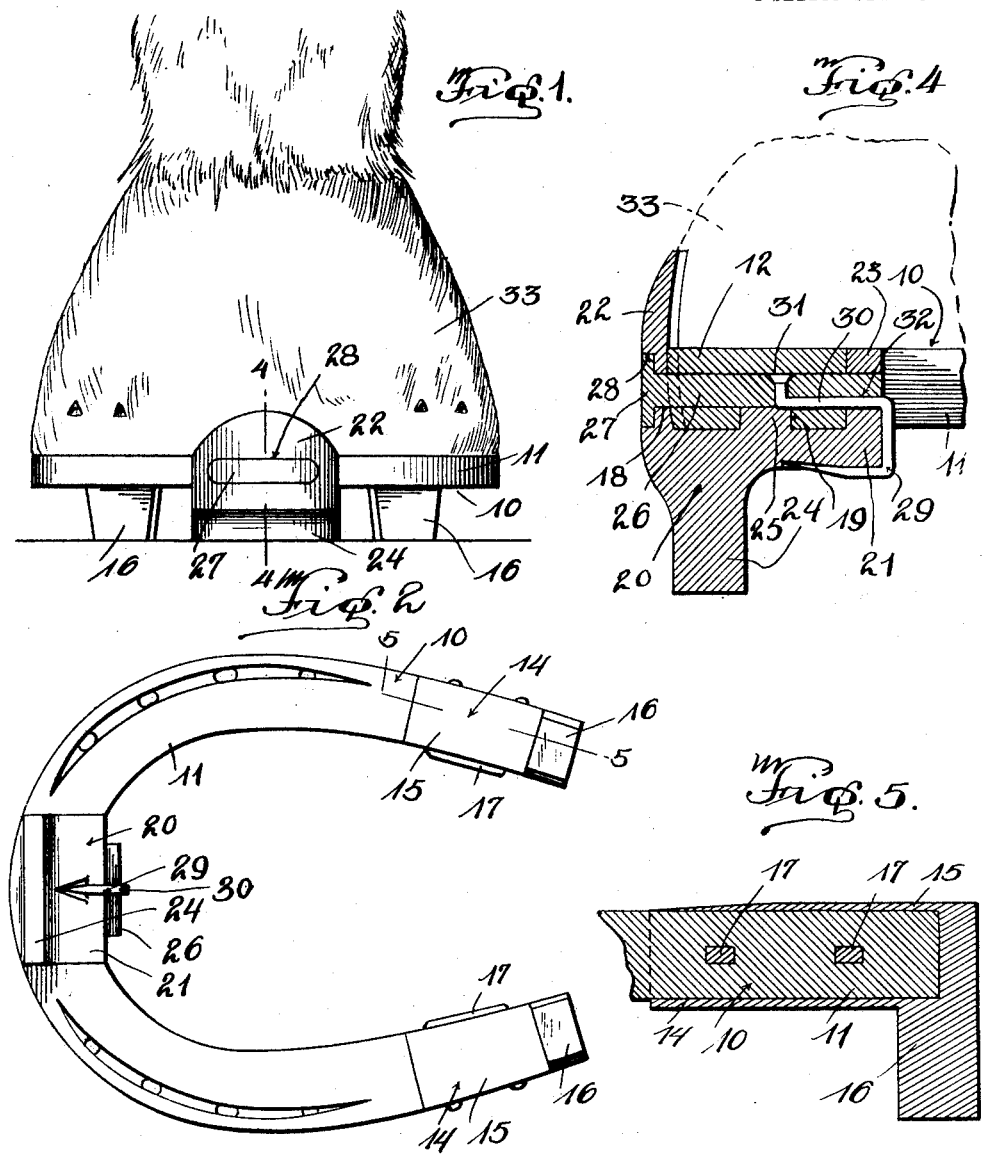
Witnesses
Ernest Crscher
[signature]
Inventor
W. P. Lewis
By Victor J. Evans
Attorney W. P. LEWIS.
HORSESHOE.
APPLICATION FILED SEPT. 24, 1913.
1,113,796.
Patented Oct. 13, 1914.
2 SHEETS—SHEET 2.
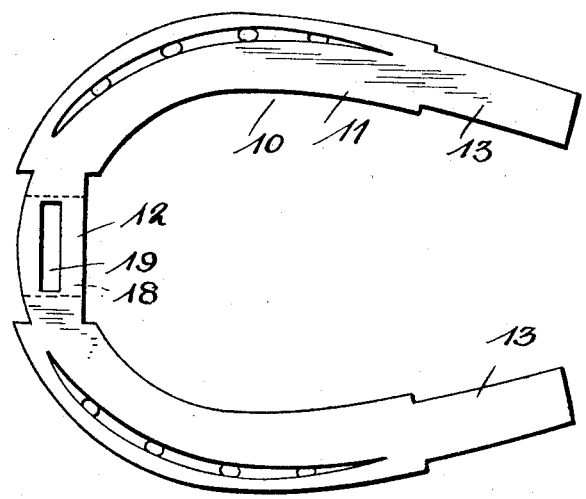
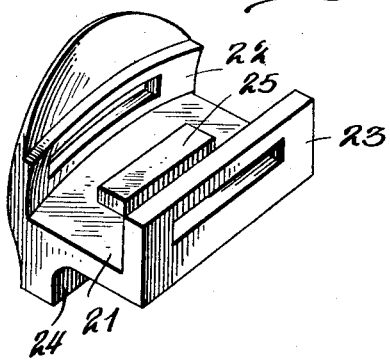
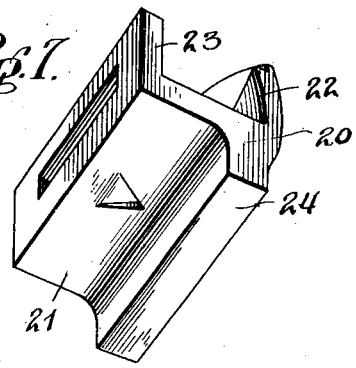
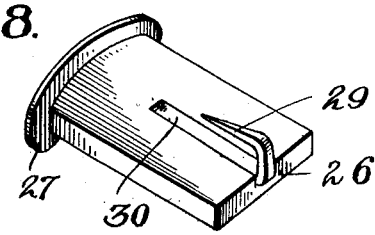
Inventor
W. P. Lewis
Witnesses
By Victor J. Evans
Attorney

UNITED STATES PATENT OFFICE.

WILFRED P. LEWIS, OF ST. LOUIS, MISSOURI.

HORSESHOE.

1,113,796. Specification of Letters Patent. Patented Oct. 13, 1914.

Application filed September 24, 1913. Serial No. 791,635.

*To all whom it may concern:*

Be it known that I, WILFRED P. LEWIS, a citizen of the United States, residing at St. Louis, State of Missouri, have invented new and useful Improvements in Horseshoes, of which the following is a specification.

An object of the invention is to provide a horseshoe for preventing a horse from slipping upon the highway or upon slippery or frozen pavements.

The invention embodies, among other features, a horseshoe provided with removable calks which are arranged upon the horseshoe or shoe body in such a manner that the calks can be readily removed for sharpening or for substituting calks of different shapes, without necessitating the use of a blacksmith or other person skilled in applying shoes to horses.

The invention further embodies a horseshoe which is adapted to normally support calks having blunted edges for use on highways or streets during the summer season, the calks having the blunted edges being replaceable by calks with pointed ends or projections which will constitute efficient gripping members in the winter time to grip the highway or slippery pavements and prevent the horse from slipping.

In the further disclosure of the invention reference is to be had to the accompanying drawings, constituting a part of this specification, in which similar characters of reference denote corresponding parts in all the views, and in which:

Figure 1 is a front elevation of the horseshoe showing the same applied to the hoof of a horse; Fig. 2 is a bottom plan view of the horseshoe showing the calks in position on the horseshoe; Fig. 3 is a similar bottom plan view showing the horseshoe without calks; Fig. 4 is a vertical sectional view taken on the line 4—4 in Fig. 1; Fig. 5 is a vertical sectional view taken on the line 5—5 in Fig. 2; Fig. 6 is a perspective view of the toe calk, looking at the upper side thereof; Fig. 7 is a perspective view of the toe calk looking at the under side thereof; and Fig. 8 is a perspective view of the securing member for the toe calk.

Referring more particularly to the views, I disclose a horseshoe 10 including a shoe body 11 having a reduced toe portion 12 and reduced heel portions 13. Heel calks 14, each comprising a tubular shank 15 and an integral depending head 16, are adapted for connection with the shoe body 11 on the heel portions 13, the reduced heel portions 13 being received in the tubular shanks 15 so that the heads 16 of the heel calks will depend at the rear end of the shoe body as shown, staples 17 being passed horizontally through the shoe body and the shanks 15 and having their free ends bent to rigidly retain the heel calks 14 in position on the reduced heel portions 13.

The reduced toe portion 12 is provided with a horizontal slot 18 and a vertical slot 19 and a toe calk 20 is adapted for connection with the reduced toe portion 12, the said toe calk preferably consisting of a single piece of material including a plate 21 having a front slotted flange 22 and a rear slotted flange 23, with a head 24 formed with the plate 21 at the forward end thereof and depending therefrom, the said plate being either blunted or sharpened. A bur 25 projects upwardly from the plate 21 at the medial portion thereof and when the toe calk 20 is applied to the reduced toe portion 12, the bur 25 will extend through the vertical slot 19 and the front flange 22 will lie flush with the peripheral face of the shoe body, the reduced toe portion 12 being interposed between the front and rear flanges 22 and 23 as shown, with the slots in the front and rear flanges registering with the horizontal slot 18 in the reduced toe portion 12 so that a securing plate 26 provided with an enlarged head 27 can be passed horizontally through the slot in the front flange 22, the horizontal slot 18 in the reduced toe portion 12 and the slot in the rear flange 23, thus securing the toe calk 20 rigidly upon the shoe body 11, the head 27 of the securing plate being adapted to limit the inward movement of the plate, with the head extending into a recess 28 in the front flange 22 to lie flush with the face of the said front flange. A locking member 29 is provided for the securing plate 26 and consists of a nail-like body 30 having one end thereof looped and passed through an opening 31 in the securing plate, with the free end of the body projecting rearwardly in a groove 32 in the plate 26 with the extreme free end of the locking member located beyond the rear flange 23 and adapted to be bent downwardly upon the rear flange, thus rigidly securing the locking plate in position to lock and retain the toe calk 20 upon the toe portion of the shoe body.

The horseshoe is mounted upon a hoof 33 of the horse in the usual manner and it will then be seen that the heads 16 of the heel calks 14 and the head 24 of the toe calk 20 will support the horseshoe in spaced relation to the ground, the said heads being either pointed or blunt in order to properly grip the surface of the roadway and prevent the horse from slipping.

By simply bending the free end of the locking member 29 upwardly, the securing plate 26 can be removed from engagement with the toe calk 20 and the reduced toe portion of the shoe body, thus permitting of entirely removing the toe calk 20 from the shoe body for the purpose of sharpening the head 24 of the toe calk or applying a different style of toe calk to the reduced toe portion 12 of the shoe body. In a similar manner, the free ends of the staples 17 can be bent upwardly to permit of removing the staples 17 from the reduced heel portions 13 of the shoe body so that the heel calks 14 can be removed from the reduced heel portions 13 for the purpose of sharpening the same or applying new heel calks to the ends of the shoe body.

Having thus described my invention, I claim:

1. In a horseshoe, the combination with a shoe body, of a slotted toe calk secured on the front end of the shoe body, a plate passing through the shoe body and the slots in the toe calk to hold the same on the shoe body, and a wire-like locking member rigidly secured in the securing plate and projecting rearwardly and downwardly to have its free end engage the said toe calk on the under side thereof to hold the securing plate rigidly relatively to the said toe calk and said shoe body.

2. In a horseshoe, the combination with a shoe body having a reduced slotted toe portion, of a toe calk on the front end of the shoe body, a projection on the toe calk and passing through the slotted portion of the shoe body, slotted plates on the toe calk and rising upwardly above the horizontal plane of the shoe body, a securing member passing through the slots in the said plates to hold the toe calk on the shoe body, and a wire-like locking member on the said securing member and bent rearwardly and downwardly to engage the under side of the toe calk and rigidly lock the securing member thereto.

In testimony whereof I affix my signature in presence of two witnesses.

WILFRED P. LEWIS.

Witnesses:
ARTHUR ACKER,
PAUL W. HAHN.

---

Copies of this patent may be obtained for five cents each, by addressing the "Commissioner of Patents, Washington, D. C."